L. E. WARD.
DRAFT EQUALIZER.
APPLICATION FILED MAY 4, 1909.
937,900.
Patented Oct. 26, 1909.
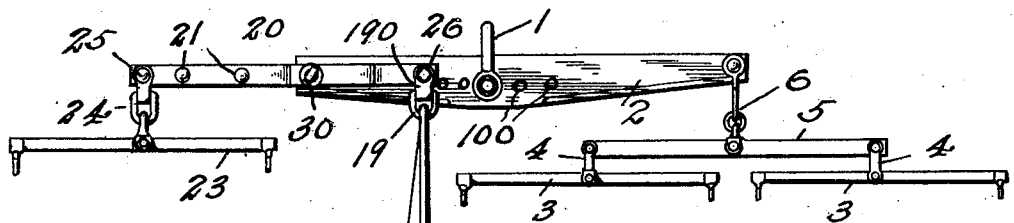
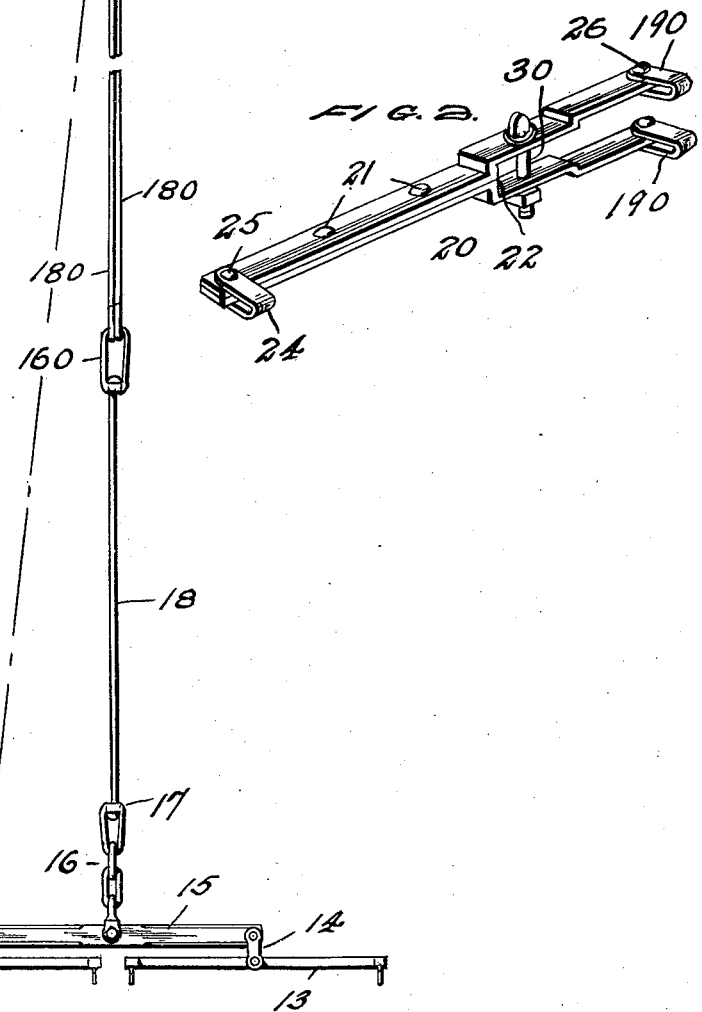
WITNESSES:
C. K. Davis
Edith L. Smith
INVENTOR:
Lester E. Ward
by
Ina C. Graham, Attorney.

UNITED STATES PATENT OFFICE.

LESTER E. WARD, OF LAKE CITY, ILLINOIS.

DRAFT-EQUALIZER.

937,900. Specification of Letters Patent. Patented Oct. 26, 1909.

Application filed May 4, 1909. Serial No. 493,959.

*To all whom it may concern:*

Be it known that I, LESTER E. WARD, a citizen of the United States, and resident of Lake City, in the county of Moultrie and State of Illinois, have invented certain new and useful Improvements in Draft-Equalizers, of which the following is a specification.

This invention relates more especially to draft equalizers; and the object of the same is to produce a device of this character which is especially designed to be used in connection with gang plows.

To this end the invention consists in the draft equalizer described below and shown in the drawings, wherein—

Figure 1 is a plan view of the device complete; and Fig. 2 is a perspective detail of the evener bar.

Referring to the drawings, the numeral 1 designates the ordinary plow clevis by which the main whiffle-tree 2 is connected with the gang plow not shown, this whiffletree being preferably of wood so that it shall be lighter. The two land side horses are hitched to swingletrees 3 connected by clevises 4 to a doubletree 5, and the latter in turn is connected by link and clevis 6 with one extremity of the whiffletree 2. No novelty is claimed for the construction at this side of the plow clevis.

The two lead horses are hitched to swingletrees 13 connected by clevises 14 to a doubletree 15, and the latter in turn is connected by links 16 and a swivel 17 to a rod 18 about four feet long. The latter is connected at its rear end by a link 160 with two rods 180 about five feet long, and at their rear ends these rods are led above and below the whiffletree 2 and connected by links 19 and clips 190 with the evener bar 20 which forms the principal part of my invention. Said evener bar, as best seen in Fig. 2, comprises upper and lower members riveted together at 21 at their outer ends and diverging from each other in a fork 22 at their inner ends, which fork stands astride and is pivotally mounted on a pin 30 at one extremity of the whiffletree 2. The single furrow horse is hitched to a swingletree 23 connected by clevis and link 24 with the outer end of the evener bar 20 at 25, while the clips 190 at the rear ends of the rods 180 are connected with the inner extremities of the fork 22 at the points 26 both above and below the whiffletree, whereby the pull on these rods is divided and the evener bar is not unduly twisted on its pivot 30. The evener bar 20 is preferably of steel, and the pin 30 may be made removable in any well known manner.

The clevises, links, and clips may also be of any well known type rendering them removable and perhaps adjustable in length.

With the above construction of parts, the two lead horses will pull against the single furrow horse and therefore the distance between the pin 30 and the pivotal point 25 for the furrow horse swingletree 23 should be about twice as great as the distance between said pin and the point 26 where the rods from the lead doubletree 15 are connected. The construction described will apply three horse power to this end of the whiffletree 2 and the power of the two land side horses to the other end, and therefore the distance between the pin 30 and the clevis 1 should be about two thirds the distance between said clevis and the point of attachment of the link 6 to the other end of the whiffletree. It is quite within the province of my invention, however, to provide the whiffletree 2 with a number of holes 100 so that the clevis 1 can be attached thereto at various points in order to permit the use of a greater number of horses on the land side, and the change can be effected in any obvious manner by the substitution for the doubletree 5 of one carrying a greater number of swingletrees 3.

This improved draft equalizer possesses the advantage that all of the horses are under the driver's eye at one time, and he can easily tell whether any one is performing too much or too little work. In the use of this invention on gang plows the furrow horse and one of the lead horses will travel in the furrow last made, and I consider the employment of long rods 18 and 180 of especial advantage because it places the lead horses so far in front of the plow that they may, and probably will of their own volition, deflect the long rods slightly as indicated in dotted lines in Fig. 1, but will not detract appreciably from the power exerted nor interfere materially with the work of the land side horse next adjacent the rods. I consider the swivel 17 of advantage for obvious reasons. A greater or lesser number of horses may also be used on the furrow side by the substitution of doubletrees carrying a greater or lesser number of swingletrees, but if only a single furrow horse is used it may be well to have the evener bar somewhat shorter than herein illustrated and thereby permit him to travel nearer to the line of draft and also permit the rods 180 to be disposed farther outward from said line.

What is claimed as new is:

In a draft equalizer, the combination with the main whiffletree, and a doubletree connected with one end thereof and carrying swingletrees; of a metallic evener bar made in two like members riveted together for about half their length and diverging from each other into a fork for the remainder of their length which fork stands astride the other end of the whiffletree, a pivot pin through the fork arms and whiffletree, a swingletree connected with the outer end of said bar, rods connected with the extremities of said fork above and below the whiffletrees, a link connecting the forward ends of said rods, a single rod leading from the link forward, a swivel connecting this rod with another link, and means on the latter link for attaching the lead horse or horses.

In testimony whereof I sign my name in the presence of two subscribing witnesses, this the 26th day of April, 1909.

LESTER E. WARD.

Witnesses:
ADELHEID BELCHER,
L. L. SMITH.